(12) United States Patent
Okpisz et al.

(10) Patent No.: US 6,898,675 B1
(45) Date of Patent: May 24, 2005

(54) DATA RECEIVED BEFORE COHERENCY WINDOW FOR A SNOOPY BUS

(75) Inventors: Alexander Edward Okpisz, Austin, TX (US); Thomas Albert Petersen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 09/138,380

(22) Filed: Aug. 24, 1998

(51) Int. Cl.[7] .............................................. G06F 12/00
(52) U.S. Cl. ...................... 711/141; 711/146; 711/118; 711/120; 711/130
(58) Field of Search .............................. 711/121, 122, 711/119, 118, 137, 147, 146, 143, 141

(56) References Cited

U.S. PATENT DOCUMENTS

| | | | |
|---|---|---|---|
| 5,404,489 A | * | 4/1995 | Woods et al. ............... 711/146 |
| 5,504,874 A | * | 4/1996 | Galles et al. ............... 709/226 |
| 5,659,708 A | * | 8/1997 | Arimilli et al. ............. 711/146 |
| 5,745,698 A | | 4/1998 | Allen et al. ................. 711/118 |
| 5,895,487 A | * | 4/1999 | Boyd et al. ................. 711/122 |
| 6,055,608 A | * | 4/2000 | Arimilli et al. ............. 711/118 |
| 6,292,872 B1 | * | 9/2001 | Arimilli et al. ............. 711/141 |

* cited by examiner

Primary Examiner—Matthew Kim
Assistant Examiner—Zhuo Li
(74) Attorney, Agent, or Firm—Anthony V. S. England; Robert M. Carwell; Dillon & Yudell LLP

(57) ABSTRACT

Where a null response can be expected from devices snooping a load operation, data may be used by a requesting processor prior to the coherency response window. A null snoop response may be determined, for example, from the availability of the data without a bus transaction. The capability of accelerating data in this fashion requires only a few simple changes in processor state transitions, required to permit entry of the data completion wait state prior to the response wait state. Processors may forward accelerated data to execution units with the expectation that a null snoop response will be received during the coherency response window. If a non-null snoop response is received, an error condition is asserted. Data acceleration of the type described allows critical data to get back to the processor without waiting for the coherency response window.

20 Claims, 3 Drawing Sheets

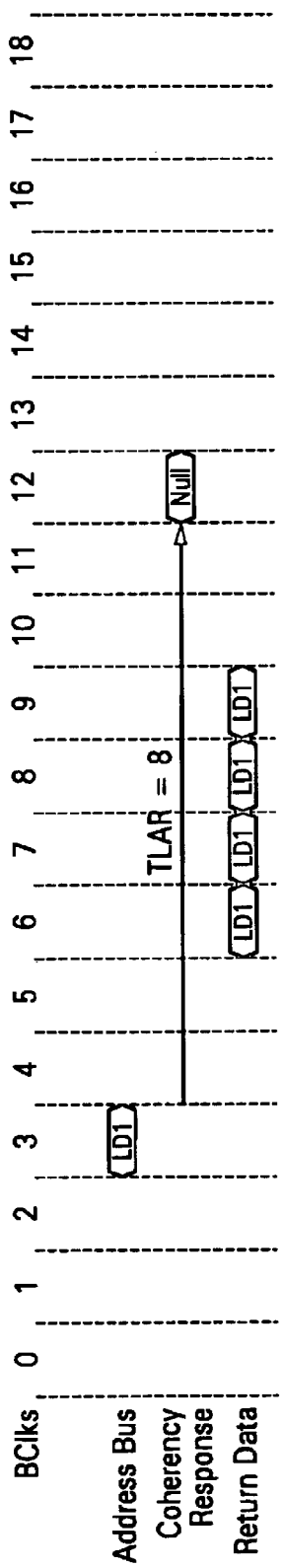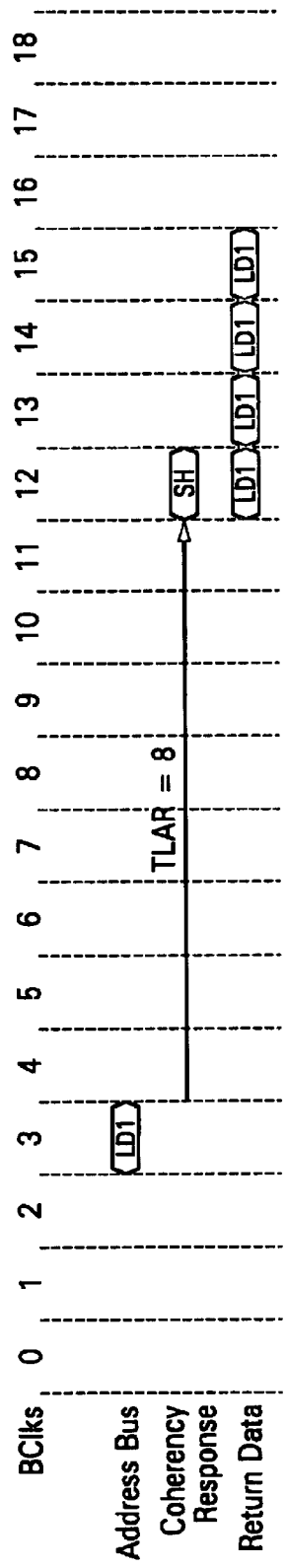

DATA RECEIVED BEFORE COHERENCY WINDOW FOR A SNOOPY BUS

BACKGROUND OF THE INVENTION

1. Technical Field

The present invention relates in general to load operations by processors in a multiprocessor system and in particular to load operations which utilize data received prior to a coherency response window.

2. Description of the Related Art

Most contemporary high-performance data processing system architectures include multiple levels of cache memory within the storage hierarchy. Caches are employed in data processing systems to provide faster access to frequently used data over access times associated with system memory, thereby improving overall performance. Cache levels are typically employed in progressively larger sizes with a trade off to progressively longer access latencies. Smaller, faster caches are employed at levels within the storage hierarchy closer to the processor or processors, while larger, slower caches are employed at levels closer to system memory.

In multiprocessor systems, bus operations initiated by one processing segment—a processor and any in-line caches between the processor and the shared bus—are typically snooped by other processing segments for coherency purposes, to preserve data integrity within cache segments shared among the various processing segments. In such systems, a processor initiating a load operation may be required to wait for a coherency response window—for responses from other devices snooping the load operation—to validate data received in response to the load request.

In known processors, such as the PowerPC™ 620 and 630FP available from International Business Machines Corporation of Armonk, N.Y., the coherency response window is programmable from two bus cycles to as many as sixteen bus cycles. A timing diagram for a processor employing an eight cycle coherency response window or Time Latency to Address Response (TLAR) is depicted in FIG. 4. Such larger TLARs may be required for slow bus devices or bridges which need to get information from down stream.

Processors utilizing a snoopy bus may receive data before the coherency response window and hold the data, for example, in a buffered read queue or a bus interface unit, until the coherency response window. However, the processor may not use the buffered data due to possible invalidation in the coherency response window. Thus, the processor load operation is limited by the latency associated with the coherency response window. Processors receiving data concurrently with the coherency response window, on the other hand, eliminate the buffering but still incur the latency associated with the coherency response window.

Where only one or two cache levels are implemented in a data processing system, the latency associated with a coherency response window for a load operation may be acceptable since a longer latency may be required to source the requested data from system memory or a bridge device. The frequency of occasions when an L2 cache hits but the processor must wait for the coherency response window may, as a result of the L2 cache's small size, be too low to be a significant performance concern. Where more cache levels are implemented, however, such as an L3 cache, circumstances may change. A larger L3 cache should result in more cache hits, where requested data could be sent to the processor prior to the coherency response window. However, current architectures do not permit the data to be utilized by the processor prior to the TLAR.

It would be desirable, therefore, to provide a mechanism allowing data received by a processor to be used by the requesting processor prior to the coherency response is window.

SUMMARY OF THE INVENTION

It is therefore one object of the present invention to improve load operations by processors in a multiprocessor system.

It is another object of the present invention to allow load operations to complete prior to a coherency response window.

It is yet another object of the present invention to allow a processor to utilize data received prior to a coherency response window.

The foregoing objects are achieved as is now described. Where a null response can be expected from devices snooping a load operation, data may be used by a requesting processor prior to the coherency response window. A null snoop response may be determined, for example, from the availability of the data without a bus transaction. The capability of accelerating data in this fashion requires only a few simple changes in processor state transitions, required to permit entry of the data completion wait state prior to the response wait state. Processors may forward accelerated data to execution units with the expectation that a null snoop response will be received during the coherency response window. If a non-null snoop response is received, an error condition is asserted. Data acceleration of the type described allows critical data to get back to the processor without waiting for the coherency response window.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a timing diagram for a load operation in which the processor receives the requested data prior to a coherency response window in accordance with a preferred embodiment of the present invention;

FIG. 4 is a timing diagram for a load operation in accordance with the known art.

DETAILED DESCRIPTION OF THE PREFERRED EMBODIMENT

Figure 1:
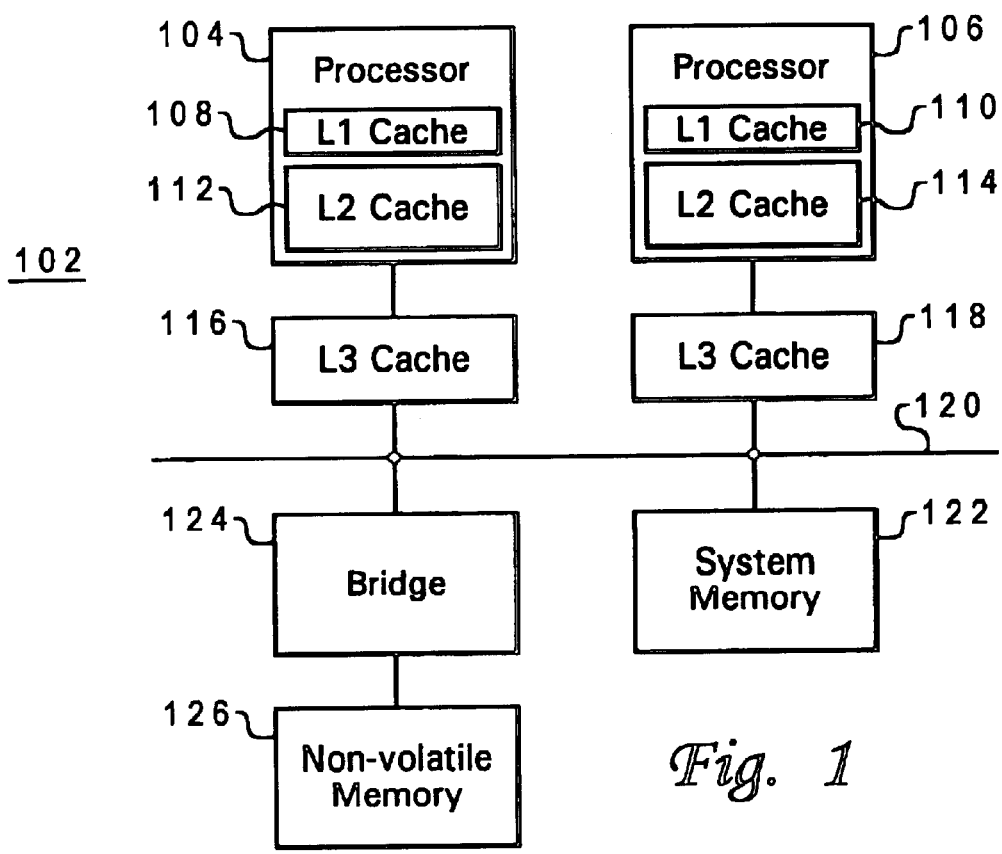
FIG. 1 depicts a block diagram of a multiprocessor system in which a preferred embodiment of the present invention may be implemented.

With reference now to the figures, and in particular with reference to FIG. 1, a block diagram of a multi-processor system in which a preferred embodiment of the present invention may be implemented is depicted. Multi-processing system 102 includes processors 104 and 106, which preferably conform to the specifications of the PowerPC™ family of processors. Each processor 104 and 106 includes an on-chip L1 cache 108 and 110, respectively, and in-line L2 and L3 caches 112 and 114, respectively, and 116 and 118, respectively. L2 caches 112 and 114 and L3 caches 116 and 118 connect the respective processors 102 and 104 to system bus 120. For each processing segment, the respective L1 and L2 caches are onboard with the processor in the exemplary embodiment, while the L3 cache remains in-line.

Also connected to system bus 120 in the exemplary embodiment is system memory 122 and bridge 124 coupling nonvolatile storage 126 to system bus 120. Those skilled in the art will recognize that multiprocessor system 102 may also include other components not shown such as a keyboard, mouse or other input devices, a display, a network interface card, etc. Such variations are within the spirit and scope of the present invention.

Multiprocessor system 102 in the exemplary embodiment includes a coherency protocol such as the MESI protocol or a variant. The modified (M) coherency state indicates that only one cache has the valid copy of the data, and that copy is "dirty" or modified with respect to the copy in system memory. The exclusive (E) coherency state is defined to signify that only one cache has a valid copy of the data, which is unmodified with respect to the data in system memory. The shared (S) coherency state denotes that one or more caches have copies of the data and that no copy is modified with respect to system memory. The invalid (I) coherency state indicates that no caches have a valid copy of the data. Additional coherency states may also be implemented.

In the exemplary embodiment, processors 104 and 106 may receive data requested by a load operation before the coherency response window. This data may be utilized by the processor, including forwarding the data to the execution units, provided the tag for the requested cache segment indicates that a null response will be received from snooping devices. To safely utilize data prior to the coherency response window, the processor must determine that no other processor or horizontal cache has a copy of the requested data in the modified, exclusive, or shared coherency state (i.e. the requested data is in the exclusive state within the storage device sourcing the data in response to the request) and that the snooped operation will therefore not be retried. This is accomplished utilizing a null response from the bus.

In the exemplary embodiment of FIG. 1, because the L2 cache is on board with the processor, it need not wait for the coherency response to begin sourcing the data because it does not utilize the bus. The L3 cache is accessed through the bus, requiring the coherency window wait.

Referring now to FIG. 2, a timing diagram for a load operation in which the processor receives the requested data prior to a coherency response window in accordance with a preferred embodiment of the present invention is illustrated. As may be seen, the requested data is sourced to the processor several cycles before the coherency response window, only two bus cycles after the address for the subject load operation is placed on the address bus. A null response is received in the coherency response window, as expected.

The capability of utilizing received data prior to a coherency response window requires only a few simple differences in state transitions to implement. Extra transitions are required for the ability to enter the data completion wait state prior to the response wait state. These differences are apparent from Tables I and II.

TABLE I

| Current State | Next State | Explanation |
| --- | --- | --- |
| Address Start | Response Window Wait | The address is on the bus; awaiting a response. |
| Response Window Wait | Data Completion Wait | Response received concurrent with data; if data is verified as good, the data wait state must be |

TABLE I-continued

| Current State | Next State | Explanation |
| --- | --- | --- |
| | | entered until all data is received. |
| Data Completion Wait | Idle | All data has been received. |

Table I illustrates the state transitions required for a load operation in accordance with the known art, without data acceleration as described herein. Only four states are necessary, and the transitions sequence through the states with only one possible "Next State" for each "Current State."

TABLE II

| Current State | Next State | Explanation |
| --- | --- | --- |
| Address Start | Data Completion Wait | Data arrived before the response window. |
| Address Start | Response Window Wait | Data arrives concurrent with or after response window |
| Data Completion Wait | Idle | All data and the response have been received. |
| Data Completion Wait | Response Window Wait | All data has been received, but the response has not. |
| Response Window Wait | Data Completion Wait | Response has been received concurrent with the data. If the data is determined to be good, the data wait state must be entered until all data is received. |

Table II illustrates the state transitions required for a load operation in accordance with the present invention, with data acceleration as described herein. Additional state transitions are required due to the possibility of the data arriving before the response. Three possible alternatives are necessary: data arriving before the response; data arriving with the response; and the response arriving during the data transfer. The state transitions in Table II accommodate all three alternatives.

Figure 3:
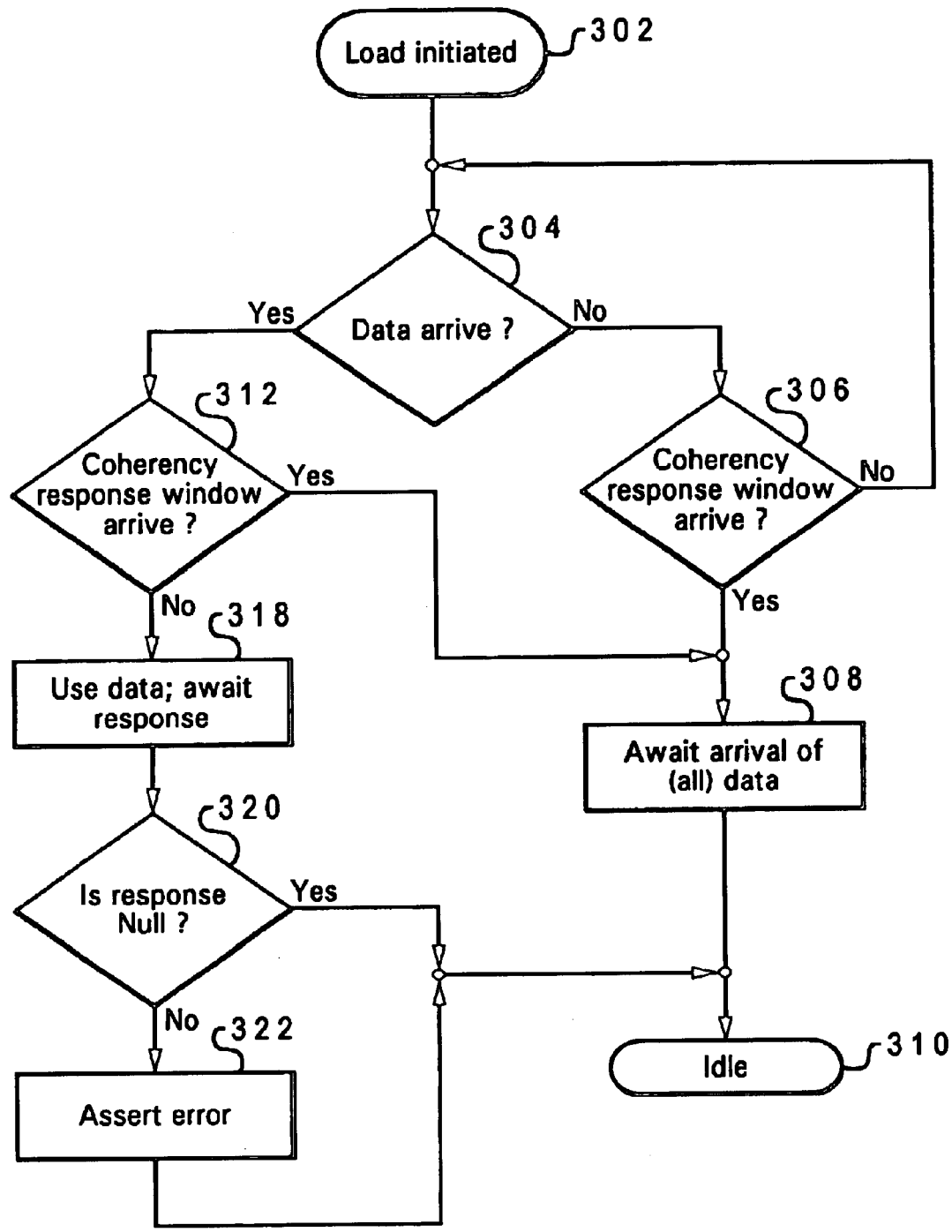
FIG. 3 is a high level flowchart for a process of accelerating data responses in accordance with a preferred embodiment of the present invention.

With reference now to FIG. 3, a high level flowchart for a process of utilizing accelerating data responses in accordance with a preferred embodiment of the present invention is depicted. The process is implemented within a processor receiving data from a lower level cache in the storage hierarchy. The process begins at step 302 which depicts initiation of a load operation initiated by the processor.

The process next passes to step 304, which illustrates a determination of whether the data has been received. If not, the process passes to step 306, which illustrates a determination of whether the coherency response window has been reached. This may occur when the data arrives concurrent with or after the coherency response window. If the coherency response window has not been reached, the process returns to step 304. If the coherency response window has been reached, however, the process proceeds instead to step 308, which depicts awaiting the arrival of the requested data, and then passed to step 310, which illustrates the process becoming idle until another load operation is initiated.

Referring back to step 304, if the requested data is received by the processor, the process proceeds instead to step 312, which depicts a determination of whether the coherency response window has been reached. This may occur when the data arrives concurrent with the coherency response window. In that event, the process proceeds to step 308, described above.

From step 314, the process proceeds instead to step 318, which illustrates using the received data if it is good (i.e., based on parity or ECC checking) and awaiting the coherency response. The data may-be forwarded to execution units within the processor as operands. The process then passes to step 320, which depicts a determination of whether the response received during the coherency response window was null. If so, the process proceeds to step 310, described earlier. If not, however, the process proceeds instead to step 322, which depicts asserting an error condition, and then to step 310. The error condition must be asserted to prevent damage to the data integrity where another processor has a copy of the data. However, this occurrence should be so infrequent as to be far outweighed by the performance increase achieved by utilizing accelerated data prior to the coherency snoop response window. In fact, the system should essentially guarantee that data will not be sent early without the null bus response, with the error checking implemented as a failsafe.

The present invention allows critical data to be sourced to a processor and utilized by the processor (returned to the execution units) prior to the coherency response window for snooping devices within the system. The data is used prior to the coherency response window if a null snoop response is expected, such as where the data is sourced by a cache having an exclusive copy of the data. If a non-null snoop response is subsequently received in the coherency response window, an error condition is asserted. The performance increase resulting from utilizing data without waiting for the coherency response window-outweighs the likely impact of any errors resulting from non-null snoop responses.

While the invention has been particularly shown and described with reference to a preferred embodiment, it will be understood by those skilled in the art that various changes in form and detail may be made therein without departing from the spirit and scope of the invention.

What is claimed is:

1. A method of accelerating data retrieval, comprising:
   initiating a bus operation requesting data;
   receiving the requested data before a defined period for response to the bus operation has elapsed, wherein a null response to the bus operation is implicit in receipt of the request data prior to elapse of the defined period; and
   utilizing the requested data prior to receiving a response during the defined period for response.

2. The method of claim 1, wherein the step of initiating a bus operation requesting data further comprises:
   initiating a read bus operation.

3. The method of claim 1, wherein the step of initiating a bus operation requesting data further comprises:
   initiating the bus operation on a snoopy bus.

4. The method of claim 1, wherein the step of receiving the requested data before a defined period for response to the bus operation has elapsed further comprises:
   receiving the requested data before a device snooping the bus operation returns a coherency response to the bus operation.

5. The method of claim 1, wherein the step of determining whether a null response to the bus operation is expected further comprises:
   determining whether copies of the requested data are contained within multiple devices within a storage hierarchy including a device initiating the bus operation.

6. The method of claim 1, wherein the step of utilizing the data further comprises:
   forwarding the data to an execution unit.

7. The method of claim 1, further comprising:
   not transmitting the requested data prior to a non-null coherency response to the bus operation.

8. The method of claim 7, wherein the step of receiving the requested data before a defined period for response to the bus operation has elapsed further comprises:
   receiving the requested data from a storage device on a chip with a requesting device, wherein the storage device does not need to source the requested data utilizing a bus transaction.

9. The method of claim 1, further comprising:
   monitoring a response to the bus operation.

10. The method of claim 9, further comprising:
    responsive to determining that the response to the bus operation was not the expected null response, signaling a machine check error.

11. A mechanism for accelerating data retrieval, comprising:
    a multiprocessor system including a system bus;
    a first data storage device within the multiprocessor system, said first storage device:
      initiating a bus operation requesting data,
      receiving the requested data from a second storage device within the multiprocessor system before a defined period for response to the bus operation has elapsed a null response to the bus operation implicit in receipt of the requested data prior to elapse of the defined period; and
      utilizing the requested data prior to receiving a response during the defined period for response.

12. The mechanism of claim 11, wherein the first data storage device further comprises a processor initiating a read bus operation.

13. The mechanism of claim 11, wherein the system bus is a snoopy bus.

14. The mechanism of claim 11, wherein the second data storage device comprises a cache sourcing the requested data to the first data storage device before every other data storage device snooping the bus operation returns a coherency response to the bus operation.

15. The mechanism of claim 11, wherein the second data storage device does not source the requested data prior to elapse of the defined period for a non-null coherency response to the bus operation.

16. The mechanism of claim 11, wherein the first data storage device forwards the requested data to an execution unit prior to the defined period elapsing.

17. The mechanism of claim 11, wherein the first data storage device does not receive the requested data prior to elapse of the defined period for a non-null coherency response to the bus operation.

18. The mechanism of claim 17, wherein the first data storage device and the second data storage device on a single chip, such that the second data storage device does not need to utilize a bus transaction to source the requested data.

19. The mechanism of claim 11, wherein the first data storage device monitors a response to the bus operation.

20. The mechanism of claim 19, wherein the first data storage device, responsive to determining that the response to the bus operation was not the expected null response, signals a machine check error.

* * * * *